United States Patent
Kobayashi et al.

(10) Patent No.: US 6,292,354 B1
(45) Date of Patent: Sep. 18, 2001

(54) LAMINATED CERAMIC CAPACITOR HAVING A REDUCTION-RESISTANT DIELECTRIC CERAMIC THAT INCLUDES GRAINS

(75) Inventors: Fumiyuki Kobayashi, Takefu; Kazuaki Kawabata, Fukui; Yasushi Ueno, Takefu; Yoshikazu Takagi, Sabae; Yasunobu Yoneda, Takefu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/603,043

(22) Filed: Jun. 26, 2000

(30) Foreign Application Priority Data

Jun. 30, 1999 (JP) .................................. 11-185450

(51) Int. Cl.$^7$ ...................................... H01G 4/06
(52) U.S. Cl. .................... 361/321.2; 361/321.4; 361/321.5
(58) Field of Search ..................... 361/311, 312, 361/313, 321.2, 321.4, 321.5; 501/134, 135, 136; 29/25.42

(56) References Cited

U.S. PATENT DOCUMENTS 4,223,369 * 9/1980 Burn .................................. 361/321.4
5,680,291 * 10/1997 Kim et al. ......................... 361/321.4
6,101,693 * 8/2000 Kim et al. ........................... 29/25.42
6,205,015 * 3/2001 Wada et al. ...................... 361/321.4

FOREIGN PATENT DOCUMENTS 11-233363 * 8/1999 (JP) .

* cited by examiner

Primary Examiner—Anthony Dinkins
(74) Attorney, Agent, or Firm—Ostrolenk, Faber, Gerb & Soffen, LLP

(57) ABSTRACT

The present invention provides a laminated ceramic capacitor having good temperature characteristics, and suitable for attaining miniaturization, large capacitance and low production cost besides having high reliability in the high temperature load test, wherein a plurality of inner electrodes are formed in a ceramic sintered body comprising a reduction resistant dielectric ceramic in which grains having a core-shell structure and grains having a homogeneous structure are mixed together, and wherein outer electrodes are formed on the outer surfaces of the ceramic sintered body, the area ratio between the total area of the grains having the core-shell structure and the total area of the grains having the homogeneous structure being adjusted within a the range of about 2:8 to 4:6 when a cross section is observed along an arbitrary direction of the ceramic sintered body.

4 Claims, 1 Drawing Sheet

LAMINATED CERAMIC CAPACITOR HAVING A REDUCTION-RESISTANT DIELECTRIC CERAMIC THAT INCLUDES GRAINS

BACKGROUND OF THE INVENTION

1. Field of the Invention

The present invention relates to a laminated ceramic capacitor and a method for manufacturing the same. In more detail, the present invention relates to a laminated ceramic capacitor using a base metal for inner electrodes in order to realize good electrostatic capacitance-temperature characteristics and large electrostatic capacitance, and a method for manufacturing the same.

2. Description of the Related Art

Barium titanate based ferroelectric ceramics in a laminated ceramic capacitor have been composed of grains comprising a core-shell structure and grains with a homogeneous composition. A shell layer is formed around the core in the grains comprising the core-shell structure. In the barium titanate based ferroelectric ceramics, grains of the barium titanate based ferroelectric ceramic forms the core, around which the shell layer is constructed of a dielectric material having a lower specific dielectric constant than that of barium titanate.

The grains with a homogeneous composition refers those merely composed of barium titanate, or those having no core-shell structure such as where the shell component in the core-shell structure is diffused and solubilized to form a homogeneous solid solution.

In manufacturing the laminated ceramic capacitor described above, starting materials in the ceramics such as $TiO_2$ and $BaCO_3$ are weighed and mixed, followed by calcination, as a core-forming material. The calcinated material obtained is ground into a calcinated powder. Materials for forming the shell portion such as an organic binder, a dispersing agent and water are mixed with the powder thereafter to obtain a ceramic slurry. A ceramic green sheet is obtained by molding the ceramic slurry into a sheet using, e.g., a doctor blade method. Then, inner electrodes are formed by printing a conductive paste containing a metal power such as Ag, Ag—Pd and Ni powder on the ceramic green sheet.

A plurality of the ceramic green sheets on which inner electrodes have been formed are laminated, followed by laminating an appropriate number of plain ceramic green sheets on the uppermost and lowermost layers of the laminate, to obtain a laminated body. A ceramic sintered body is obtained by firing the laminated body after pressing it along the direction of thickness. The laminated ceramic capacitor is manufactured by forming outer electrodes on both end faces of the sintered body obtained as described above.

It is believed that good temperature characteristics are obtained in the laminated ceramic capacitor comprising the grains having the core-shell structure and homogeneous grains.

Recently, miniaturization, large capacitance and low production cost have been required for the ceramic capacitor. Accordingly, the ceramic capacitor comprising the grains having the core-shell structure and grains having the homogeneous structure are also urgently required to be miniaturized, to have large capacitance and to be manufactured with a low production cost, besides having good temperature characteristics.

It is essential for miniaturizing a laminated ceramic capacitor with large capacitance to use a starting material having a high specific dielectric constant as the ceramic material, along with thinning the ceramic layers among the inner electrodes. Also, a base metal such as Ni is used for reducing the production cost.

Using Ni as the inner electrode contributes for reducing the production cost in the laminated ceramic capacitor using a ceramic sintered body comprising the grains having the core-shell structure and the grains having the homogeneous structure. However, attaining further miniaturization and larger capacitance was difficult in the dielectric ceramics having the barium titanate structure as hitherto described, because its specific dielectric constant is 4,000 at best.

Although use of a ceramic material having a lead based perovskite structure may be contemplated, the material may adversely affect the environment since it contains lead.

SUMMARY OF THE INVENTION

Accordingly, the object of the present invention is to provide a laminated ceramic capacitor comprising a core-shell structure in which a dielectric ceramic that can exhibit good electrostatic capacitance-temperature characteristic is used while using a base metal as an electrode material, in order to practically reduce the manufacturing cost besides attaining miniaturization and large capacitance of the ceramic capacitor.

In accordance one aspect, the present invention provides a laminated ceramic capacitor comprising: a ceramic sintered body comprising a reduction-resistant dielectric ceramic; a plurality of inner electrodes comprising a base metal disposed in the ceramic sintered body so as to be stacked along the direction of thickness via a ceramic layer; and a pair of outer electrodes formed on the outer surfaces of the ceramic sintered body and electrically connected to either of the inner electrodes, wherein grains having a core-shell structure and homogeneous grains are mixed together in the ceramic sintered body comprising the reduction-resistant dielectric ceramic, the grains having the core-shell structure and the grains having the homogeneous structure are mixed with an area ratio in the range of about 2:8 to 4:6 when an arbitrary cross section of the ceramic sintered body is observed.

The production cost may be reduced in the laminated ceramic capacitor according to the present invention since the inner electrodes are made of a base metal. Also, since the grains having the core-shell structure and the grains having the homogeneous structure are mixed with an area ratio in the range of about 2:8 to 4:6 when an arbitrary cross section of the ceramic sintered body is observed, the specific dielectric constant can be increased up to 4,500 or more as will be made clear in the examples to be described hereinafter, which is advantageous for attaining miniaturization and large capacitance. The D-characteristics of the static capacitance-temperature characteristics in the JIS standard are satisfied since the laminated ceramic capacitor comprises a core-shell structure.

The laminated ceramic capacitor according to the present invention is featured in that miniaturization and large capacitance can be attained while maintaining good static capacitance-temperature characteristics, by adjusting the mixing ratio between the grains having a core-shell structure and the grains having a homogeneous structure in the specified proportion described above.

A barium titanate based ceramic is preferably used as the reduction-resistant dielectric ceramic in the present invention.

In an another aspect, the present invention provides a method for manufacturing a laminated ceramic capacitor comprising the steps of: preparing a ceramic green sheet mainly comprising a reduction-resistant dielectric ceramic; forming inner electrodes by printing a base metal paste on one face of the ceramic green sheet; obtaining a laminated body by laminating a plurality of the ceramic green sheets on which the inner electrodes have been printed, and by further laminating plain ceramic green sheets on the uppermost and lowermost layers of the laminated ceramic green sheets, followed by pressing along the direction of thickness; obtaining a ceramic sintered body by firing the laminated body; and applying outer electrodes on the outer surfaces of the ceramic sintered body, wherein the firing temperature and firing time is selected so that the grains having a core-shell structure and the homogeneous grains are mixed with an area ratio in the range of about 2:8 to 4:6 in an arbitrary cross section of the ceramic sintered body.

The barium titanate based ceramic is also preferably used as the reduction-resistant dielectric ceramic in method for manufacturing the laminated ceramic capacitor according to the present invention.

DESCRIPTION OF PREFERRED EMBODIMENT

The present invention will be elucidated by describing the examples of the present invention with reference to the drawings.

Figure 1:
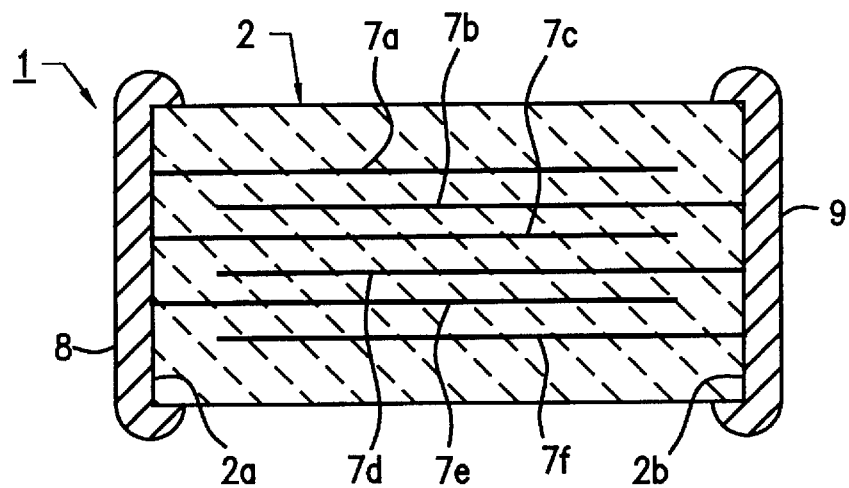
FIG. 1 is a cross section of the laminated ceramic capacitor according to one embodiment of the present invention.
Figure 2:
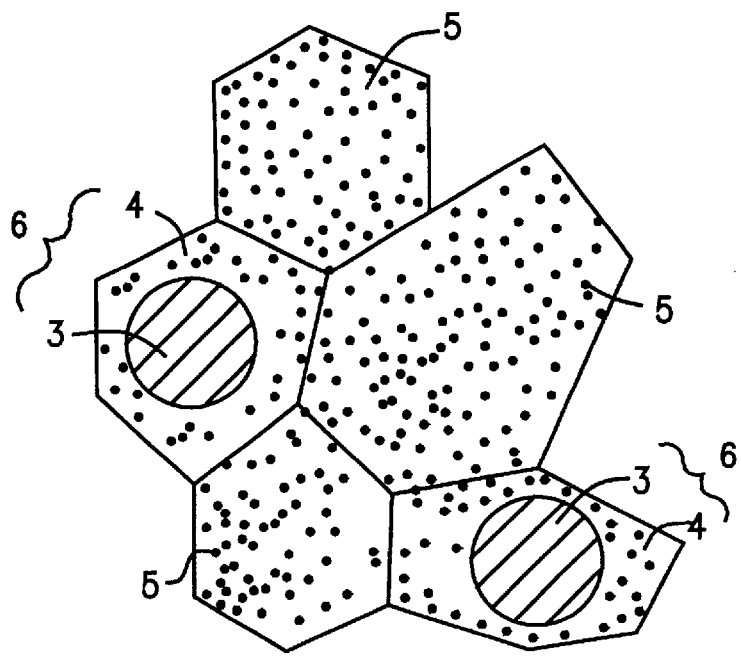
FIG. 2 is an illustrative enlarged cross section for explaining the cross sectional structure of the ceramic sintered body.

FIG. 1 is a cross section for explaining one example of the laminated ceramic capacitor according to the present invention, and FIG. 2 is an illustrative enlarged cross section showing the cross sectional structure of the ceramic sintered body.

The laminated ceramic capacitor 1 is constructed using a sintered body 2 comprising grains having a core-shell structure and grains having a homogeneous structure. The grains 6 having the core-shell structure, in which shells 4 comprising a material having a lower dielectric constant than the dielectric ceramic are formed around cores 3 comprising the dielectric ceramic grains, and grains 5 having a homogeneous structure comprising a homogeneous composition are mixed and distributed in the ceramic sintered body 2 as shown in FIG. 2.

The proportion between the area of the grains 6 having the core-shell structure and the area of the grains 5 having the homogeneous structure is adjusted within a range of about 2:8 to 4:6 when a cross section along an arbitrary direction of the ceramic sintered body 2 is observed. The proportion described above brings about a specific dielectric constant of as high as 4,500 or more, and good temperature characteristics as will be made clear in the examples to be described hereinafter.

As shown in FIG. 1, a plurality of inner electrodes 7a to 7f are disposed in the ceramic sintered body 2 so as to be stacked along the direction of thickness via a ceramic sintered body layer. Base metals such as Ni and Cu are used for forming the inner electrodes 7a to 7, in order to reduce the production cost.

The inner electrodes 7a, 7c and 7e are reach one end face 2a of the ceramic sintered body 2, while the inner electrodes 7b, 7d and 7f reach the other end face 2b in opposed relation to the end face 2a.

Outer electrodes 8 and 9, which are formed by coating and baking a conductive paste such as an Ag paste and a Cu paste, are formed so as to cover the end faces 2a and 2b. The outer electrodes 8 and 9 may be formed by plating, vacuum deposition or sputtering of conductive materials, or the outer electrodes 8 and 9 may be formed into a laminated metal film using two or more of these methods.

As described above, the laminated ceramic capacitor 1 in this embodiment is featured in that the proportion between the area of the grains 6 having the core-shell structure and the area of the grains 5 having the homogeneous structure is adjusted within a range of about 2:8 to 4:6 when a cross section along an arbitrary direction of the ceramic sintered body 2 is observed. The planar configuration of the inner electrodes 7a to 7f, the number of laminations and the construction of the outer electrodes 8 and 9 are not particularly restricted.

The following experimental results will explain how the ceramic capacitor according to this embodiment attains miniaturization and large capacitance while maintaining good electrostatic capacitance-temperature characteristics.

Powders of $BaTiO_3$, $Dy_2O_3$, $Co_2O_3$, $BaCO_3$, MgO, NiO, $ZrO_2$ and $MnCO_3$ as starting materials, and an oxide glass powder mainly composed of $BaO-SrO-LiO-B_2O_3-SiO_2$ were prepared. A calcinated powder was obtained by mixing and calcinating these powder materials followed by grinding.

The calcinated powder obtained was mixed with an organic vehicle to obtain a ceramic slurry, which was molded into a sheet as a ceramic green sheet.

The ceramic green sheet obtained was punched into a rectangular shape to obtain a rectangular ceramic green sheet. The inner electrodes 7a to 7f were formed on the ceramic green sheet by screen-printing a Ni paste. Then, 250 green sheets on which the Ni paste had been screen-printed were laminated, followed by laminating plain ceramic green sheets on the uppermost and lowermost layers of the laminate, to obtain a ceramic laminated body. After pressing the ceramic laminated body obtained along the direction of thickness, it was fired by maintaining the firing temperature listed in TABLE 1 below for 2 hours, thereby obtaining a ceramic sintered body.

The outer electrodes 8 and 9 were formed by coating and baking a Cu paste on both end faces of the ceramic sintered body to obtain a laminated ceramic capacitor with a dimension of 3.2×1.6×1.6 mm.

The proportion between the area of the grains having the core-shell structure and the area of the grains having the homogeneous structure, the electrostatic capacitance, and the rate of temperature change of the capacitance (TCC) were measured with respect to the laminated ceramic capacitor obtained as described above, which was evaluated by a high temperature load test. The methods of evaluation are as follows:

The proportion between the area of the grains having the core-shell a. structure and the area of the grains having the homogeneous structure: The ceramic sintered body of the ceramic capacitor was cut along the longitudinal direction and along the direction of thickness. Each cross section were observed under a transmittance electron microscope (TEM) to determine the proportion between the total area of the grains having the core-shell structure and the total area of the grains having the homogeneous structure. A mean value of the area ratios determined in the two cross sections is shown in TABLE 1.

The rate of temperature change of the capacitance (TCC): Electrostatic capacitances of the laminated ceramic capacitor at 20° C. and 85° C. ($C_{20}$ and $C_{85}$) were measured, and TCC was determined by calculating the proportion (%) of the change of the electrostatic capacitance ($\Delta C = C_{85} - C_{20}$) against $C_{20}$.

High temperature load test: Accelerated load test of the laminated ceramic capacitor was carried out by applying a voltage of 20V at a temperature of 150° C. The number of the capacitors not passing the high temperature load test was defined to be the number of the capacitors in which short circuit defects had occurred after 100 hours of the test period.

The rate of temperature change of capacitance (TCC) was measured with respect to 10 samples, and a mean value of the evaluation results of 10 laminated ceramic capacitors are listed in TABLE 1 below. The number of the samples (n) was 200 in the high temperature load test, and the number of the capacitors that failed to pass the high temperature load test among the 200 laminated ceramic capacitors is shown in the table.

The sample number (n) was 30 in the other evaluations.

test. Sample Nos. 3 to 9 that fall within the range of the present invention exhibited, on the other hand, specific dielectric constants ε of as high as 4,510 or more, and there were no samples that failed to pass the high temperature load test. In addition, the rate of temperature change of capacitance (TCC) was within the range of +20 to −30, satisfying the JIS D-characteristic.

Accordingly, it can be understood that the electrostatic capacitance is increased and reliability in the high temperature load test is improved without changing the capacitance-temperature characteristics, by adjusting the proportion between the area of the grains having the core-shell structure and the area of the grains having the homogeneous structure in the range of about 2:8 to 4:6.

No sample failed to pass the high temperature load test even when the thickness between the inner electrodes is as thin as 3.0 μm as seen in the sample Nos. 4, 6 and 8. Accordingly, it is understood that a fairly reliable laminated ceramic capacitor that is far more miniaturized with larger capacitance can be provided by merely controlling the area ratio as described above.

As is evident from the foregoing experimental results, the proportion between the area of the grains having the core-

TABLE 1

| No. | FIRING TEMP. (° C.) | AREA RATIO BETWEEN CORE-SHELL GRAINS AND HOMOGENEOUS GRAINS | THICKNESS OF CERAMIC LAYER BETWEEN INNER ELECTRODES | SPECIFIC DIELECTRIC CONSTANT ε | TCC (%) AT 85° C. | NUMBER NOT PASSING HIGH TEMPERATURE LOAD TEST |
|---|---|---|---|---|---|---|
| 1 | 1240 | 5:5 | 4.0 | 4230 | −12 | 3 |
| 2 | 1260 | 5:5 | 4.0 | 4380 | −14 | 2 |
| 3 | 1270 | 4:6 | 4.0 | 5120 | −22 | 0 |
| 4 | 1280 | 3:7 | 3.0 | 5650 | −27 | 0 |
| 5 | | | 4.0 | 5340 | −22 | 0 |
| 6 | 1300 | 2:8 | 3.0 | 5550 | −25 | 0 |
| 7 | | | 4.0 | 5100 | −19 | 0 |
| 8 | 1320 | 2:8 | 3.0 | 5200 | −20 | 0 |
| 9 | | | 4.0 | 4510 | −15 | 0 |
| 10 | 1350 | 1:9 | 4.0 | 3760 | −8 | 0 |

The specific dielectric constant ε was only 4,230 in the sample No. 1 in Table 1 because the proportion between the area of the grains having the core-shell structure and the area of the homogeneous grains was 1:1 at a firing temperature of 1240° C. Three samples failed to pass the high temperature load test.

The specific dielectric constant E was only 4,380 in the sample No. 2 because the proportion between the area of the grains having the core-shell structure and the area of the homogeneous grains was 1:1 at a firing temperature of 1260° C. Two samples failed to pass the high temperature load test.

In the sample Nos. 1 and 2, some samples seemed to fail to pass the high temperature load test because the proportion between the area of the grains having the core-shell structure and the area of the homogeneous grains was 1:1 at a firing temperature of as low as 1260° C. or less, and thereby the ceramic layer among the inner electrodes was not so closely sufficiently sintered.

The area ratio as described above was 1:9 in the sample No. 10 probably because the sintering temperature was as high as 1350° C. The specific dielectric constant E was also as low as 3,760 and two samples did not pass the high temperature load test. This is probably because the firing temperature was so high that grain growth had been accelerated due to high reactivity of the ceramic grains, thereby causing short-circuit defects in the high temperature load shell structure and the area of the grains having the homogeneous structure can be adjusted by controlling the firing temperature. In other words, while the present invention is featured in that the area ratio is within the range of about 2:8 to 4:6, this area ratio can be readily adjusted by controlling the firing temperature. Thus, laminated ceramic capacitor according to the present invention can be readily manufactured by selecting the firing temperature and firing time so that the area ratio falls within the range of about 2:8 to 4; 6.

Although the barium titanate based ceramics were used as the reduction-resistant dielectric ceramics in the examples described above, dielectric ceramic grains other than the barium titanate based ceramic grains such as strontium titanate ceramics may be used in the present invention.

Although the oxide glass powder mainly composed of $BaO-SrO-LiO-B_2O_3-SiO_2$ was used as the material constituting the shell structure, that material is not particularly limited thereto but various materials having a lower dielectric constant than the dielectric ceramics, for example ZnO, PbO and $B_2O_3$, may be used.

The proportion between the total area of the grains having the core-shell structure and the total area of the grains having the homogeneous structure is adjusted within the range of about 2:8 to 4:6 in the laminated ceramic capacitor, when the cross section along an arbitrary direction of the ceramic sintered body is observed. Therefore, the electrostatic capacitance is increased and occurrence of short-circuit defects in the high temperature load test is suppressed, without decreasing good capacitance-temperature characteristics of the laminated ceramic capacitor having the core-shell structure. Further, the production cost of the laminated ceramic capacitor can be reduced since the inner electrodes are composed of base metals.

Accordingly, a reliable laminated ceramic capacitor having good temperature characteristics, being suitable for miniaturization, and having a large capacitance, can be provided at a cheap production cost.

Although ceramic materials having a lead based perovskite structure with a high dielectric constant have been used for the conventional large capacitance ceramic capacitor, adverse effects on the environment can be diminished when the barium titanate based ceramics are used for the reduction-resistant dielectric ceramics according to the present invention.

The firing temperature and firing time for firing the laminated body can be selected so that the area ratio falls within the range of about 2:8 to 4:6 in the method for manufacturing the laminated ceramic capacitor according to the present invention. Consequently, the laminated ceramic capacitor according to the present invention is provided merely by controlling the firing temperature and firing time.

Adverse effects on the environment can be diminished when the barium titanate based ceramics are used for the reduction-resistant dielectric ceramics in the method for manufacturing the laminated ceramic capacitor according to the present invention, as compared with using the ceramic materials having a lead based perovskite structure as described above.

What is claimed is:

1. A laminated ceramic capacitor comprising:
   a ceramic sintered body comprising a reduction-resistant dielectric ceramic;
   a plurality of inner electrodes each comprising a base metal and said plurality of inner electrodes being disposed in the ceramic sintered body so as to be stacked along the direction of thickness with a layer of said ceramic between each pair of adjacent electrodes; and
   a pair of outer electrodes on the outer surfaces of the ceramic sintered body and electrically connected to inner electrodes,
   wherein said reduction-resistant dielectric ceramic comprises grains having a core-shell structure and homogeneous grains and wherein the grains having a core-shell structure and the grains having a homogeneous structure being in an area ratio in the range of about 2:8 to 4:6 of a cross section of the ceramic sintered body.

2. A laminated ceramic capacitor according to claim 1, wherein the reduction-resistant dielectric ceramic is a barium titanate ceramic.

3. A laminated ceramic capacitor according to claim 2, wherein the base metal comprises Ni.

4. A laminated ceramic capacitor according to claim 1, wherein the base metal comprises Ni.

\* \* \* \* \*